US012166286B2

(12) United States Patent
Yun et al.

(10) Patent No.: US 12,166,286 B2
(45) Date of Patent: Dec. 10, 2024

(54) CIRCULARLY POLARIZED ANTENNA ASSEMBLY

(71) Applicant: TE Connectivity Services GmbH, Schaffhausen (CH)

(72) Inventors: Xing Yun, Oxford, MI (US); Gordon H. Barber, Auburn Hills, MI (US)

(73) Assignee: TE CONNECTIVITY SOLUTIONS GMBH, Schaffhausen (CH)

(*) Notice: Subject to any disclaimer, the term of this patent is extended or adjusted under 35 U.S.C. 154(b) by 541 days.

(21) Appl. No.: 17/337,480

(22) Filed: Jun. 3, 2021

(65) Prior Publication Data

US 2022/0302602 A1 Sep. 22, 2022

Related U.S. Application Data

(60) Provisional application No. 63/161,621, filed on Mar. 16, 2021.

(51) Int. Cl.

*H01Q 1/48* (2006.01)
*H01Q 19/10* (2006.01)
*H01Q 21/24* (2006.01)

(52) U.S. Cl.

CPC ............... *H01Q 21/24* (2013.01); *H01Q 1/48* (2013.01); *H01Q 19/10* (2013.01)

(58) Field of Classification Search

CPC .......... H01Q 21/24; H01Q 1/48; H01Q 19/10; H01Q 9/0428; H01Q 9/0464;

(Continued)

(56) References Cited

U.S. PATENT DOCUMENTS

2002/0186173 A1* 12/2002 Wako ..................... H01Q 13/06 343/772
2008/0062058 A1* 3/2008 Bishop ..................... H01Q 1/52 343/893

(Continued)

FOREIGN PATENT DOCUMENTS

EP 1258948 A2 * 11/2002 ............. H01Q 13/06

OTHER PUBLICATIONS

Extended European Search Report, European Application No. 22161927. 3-1205 European Filing Date Jul. 21, 2022 (Year: 2022).*

(Continued)

*Primary Examiner* — Hai V Tran
*Assistant Examiner* — Michael M Bouizza

(57) ABSTRACT

An antenna assembly includes a ground plane having a periphery. The antenna assembly includes a plurality of antenna elements. Each antenna element is resonant at a frequency f. The antenna elements are positioned generally equidistant from each other around the periphery. The antenna elements are electrically connected to a single antenna feed port. The antenna elements provide a right-hand circularly polarized (RHCP) generally omnidirectional radiation pattern in a first operation mode. The antenna elements provide a right-hand circularly polarized (RHCP) broadside radiation pattern in a second operation mode. The antenna elements provide a left-hand circularly polarized (LHCP) broadside radiation pattern in a third operation mode. The antenna assembly includes a reflector positioned below the antenna elements. The reflector tilts a maximum radiation of the antenna elements upward by a tilt angle in the first operation mode to create a conical radiation pattern.

21 Claims, 8 Drawing Sheets

(58) Field of Classification Search
CPC ........ H01Q 19/104; H01Q 3/30; H01Q 15/14; H01Q 1/36; H01Q 1/50; H01Q 5/28
See application file for complete search history.

(56) References Cited

U.S. PATENT DOCUMENTS

| | | | | |
|---|---|---|---|---|
| 2012/0026066 | A1* | 2/2012 | Leisten | H01Q 9/27 343/895 |
| 2012/0299789 | A1* | 11/2012 | Orban | H01Q 5/357 333/1.1 |
| 2018/0247177 | A1* | 8/2018 | Pudenz | H01Q 9/42 |
| 2019/0198999 | A1* | 6/2019 | Ashrafi | H01Q 25/04 |
| 2022/0231417 | A1* | 7/2022 | Batel | H01Q 21/24 |

OTHER PUBLICATIONS

Dwivedy, B. et al., "Design Approach of a Wideband Frequency Tunable Triangular Patch Array with Concurrent Polarization Alteration", 2017 International Conference on Wireless Communications, Signal Processing and Networking (WiSPNET), IEEE, Mar. 22, 2017. pp 1007-1012 (Year: 2017).*

Inserra, D. et al., "Sequentially Rotated Circular Antenna Array with Curved PIFA and Series Feed Network", IEEE Transactions on Antennas and Propagation, IEEE. Nov. 1, 2018, vol. 66 No. 11, pp. 5849-5858, USA (Year: 2018).*

Extended European Search Report, European Application No. 22161927.3-1205, European Filing Date, Jul. 21, 2022.

Dwivedy, B. et al., "Design Approach of a Wideband Frequency Tunable Triangular Patch Array with Concurrent Polarization Alteration", 2017 International Conference on Wireless Communications, Signal Processing and Networking (WiSPNET), IEEE, Mar. 22, 2017. pp 1007-1012.

Inserra, D. et al., "Sequentially Rotated Circular Antenna Array with Curved PIFA and Series Feed Network", IEEE Transactions on Antennas and Propagation, IEEE. Nov. 1, 2018, vol. 66 No. 11, pp. 5849-5858, USA.

* cited by examiner 500 502 504

| Type of antenna combination | Type-1: Left-hand combination 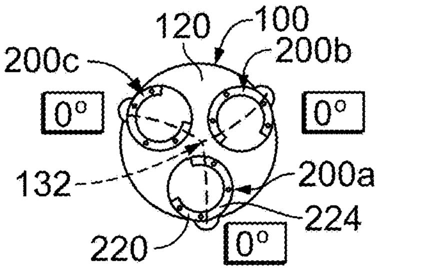  | Type-2: Left-hand combination 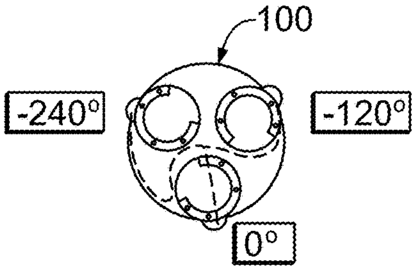  | Type-3: Left-hand combination 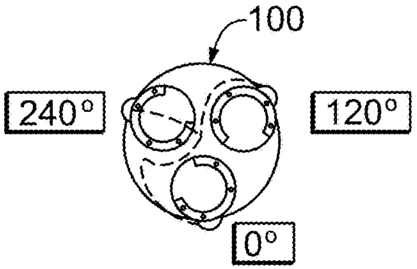  |
|---|---|---|---|
| Dominant CP component | RHCP | RHCP | LHCP |
| Radiation directionality | Omni directional in horizontal plane 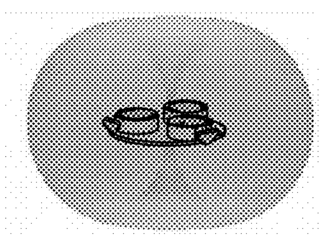 | Broadside directional 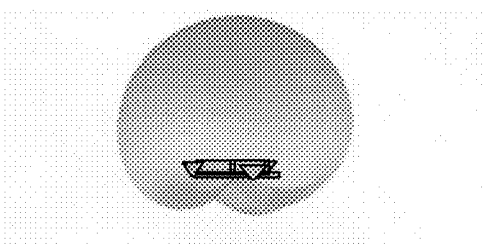 | Broadside directional 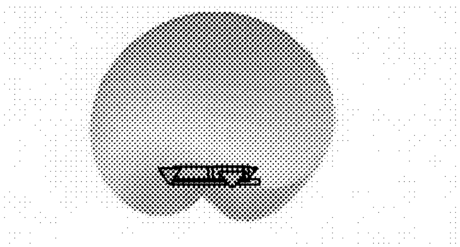 |
| Max. Gain | -0.2 dBi (RHCP) | 3.3 dBi (RHCP) | 3.9 dBi (LHCP) |
| 3dB beamwith | 95°(RHCP) | 133°(RHCP) | 112°(LHCP) |
| Axial ratio within 3dB beamwidth | < 8dB | < 6dB | < 5dB |

FIG. 5

CIRCULARLY POLARIZED ANTENNA ASSEMBLY

CROSS REFERENCE TO RELATED APPLICATIONS

This application claims benefit to U.S. Provisional Application No. 63/161,621, filed 16 Mar. 2021, titled "CIRCULARLY POLARIZED ANTENNA ASSEMBLY", the subject matter of which is herein incorporated by reference in its entirety.

BACKGROUND OF THE INVENTION

The subject matter herein relates generally to antenna assemblies.

Antenna system are used in wireless communication networks. For example, vehicles may include one or more antennas, such as AM/FM radio antennas, satellite digital audio radio service antennas, global positioning system antennas, cell phone antennas, vehicle-to-everything (V2X), and the like. The antennas are operable for transmitting and/or receiving signals to/from the vehicle. Other devices, such as handheld devices, computers, and the like, use antennas. Some antennas may be directional. Other antennas may be omnidirectional. As such, the antenna systems may provide different antennas for different types of communication. However, providing multiple antennas may increase the cost of the antenna system and/or occupy a large area. Typical omnidirectional circularly polarized antennas include normal mode helical antennas or cloverleaf antennas. However, such antennas typically have a high profile. Cloverleaf antennas are typically pole mounted and not feasible for panel mount applications. Other omnidirectional antennas include higher-order-mode patch antennas. However, such antennas are electrically large (for example, typically larger than one electrical wavelength).

There is a need for antennas small in physical dimension; having relatively high efficiency; capable of being placed in close proximity to associated electronic circuits without adversely effecting performance; easy to manufacture using standard, low-cost components; and capable of having radiation patterns altered to support different applications.

BRIEF DESCRIPTION OF THE INVENTION

In one embodiment, an antenna assembly is provided and includes a ground plane having a periphery. The antenna assembly includes a plurality of antenna elements. Each antenna element is resonant at a frequency f. The antenna elements are positioned generally equidistant from each other around the periphery. The antenna elements are electrically connected to a single antenna feed port. The antenna elements provide a right-hand circularly polarized (RHCP) generally omnidirectional radiation pattern in a first operation mode. The antenna elements provide a right-hand circularly polarized (RHCP) broadside radiation pattern in a second operation mode. The antenna elements provide a left-hand circularly polarized (LHCP) broadside radiation pattern in a third operation mode. The antenna assembly may include a reflector positioned below the antenna elements configured to tilt a maximum radiation of the antenna elements upward by a tilt angle to create a conical radiation pattern when operated in the first operation mode.

In another embodiment, an antenna assembly is provided and includes a ground plane having a periphery. The antenna assembly includes a plurality of antenna elements. Each antenna element is resonant at a frequency f. The antenna elements are positioned generally equidistant from each other around the periphery. The antenna elements are electrically connected to a single antenna feed port to provide a right-hand circularly polarized (RHCP) generally omnidirectional radiation pattern. The antenna assembly may include a reflector positioned below the antenna elements. The reflector tilts a maximum radiation of the antenna elements upward by a tilt angle to create a conical radiation pattern.

In a further embodiment, an antenna assembly is provided and includes a ground plane having a periphery. The antenna assembly includes a plurality of antenna elements. Each antenna element is resonant at a frequency f. The antenna elements are positioned generally equidistant from each other around the periphery. The antenna elements are electrically connected to a single antenna feed port. The antenna elements provide a right-hand circularly polarized (RHCP) generally omnidirectional radiation pattern in a first operation mode. The antenna elements provide a right-hand circularly polarized (RHCP) broadside radiation pattern in a second operation mode, and the antenna elements provide a left-hand circularly polarized (LHCP) broadside radiation pattern in a third operation mode.

BRIEF DESCRIPTION OF THE DRAWINGS

FIG. 5 is a chart illustrating various modes of operation of the antenna assembly in accordance with an exemplary embodiment.

DETAILED DESCRIPTION OF THE INVENTION

Figure 1:
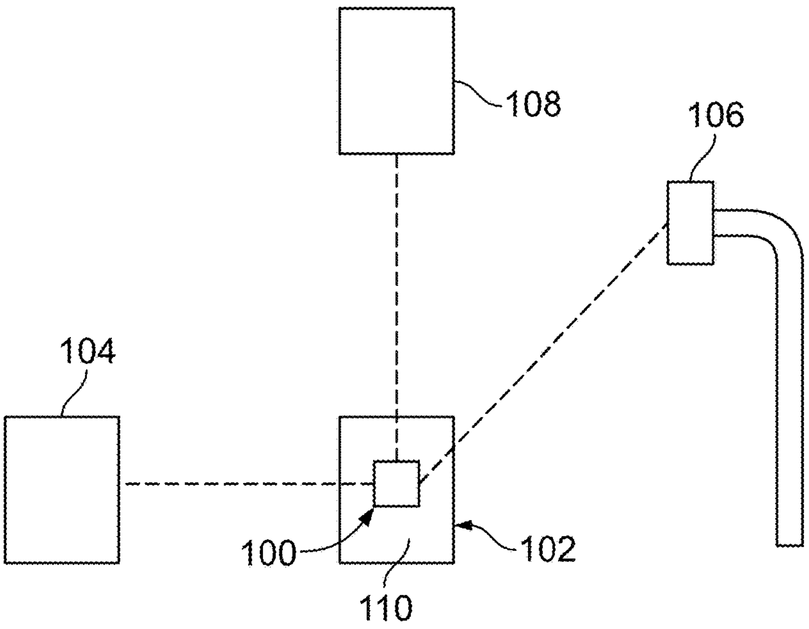
FIG. 1 illustrates an antenna assembly of a device in accordance with an exemplary embodiment.

FIG. 1 illustrates an antenna assembly 100 of a device 102 in accordance with an exemplary embodiment. The antenna assembly 100 is used to communicate with various remote devices 104, 106, 108. The first remote device 104 represents a mobile (movable) remote device (for example, a handheld device, a vehicle, and the like). The second remote device 106 represents a stationary device, such as a light pole or other traffic control or traffic monitoring device. The third remote device 108 represents a drone or satellite. Communication with the first remote device 104 is generally horizontal or in a low elevation angle. Communication with the second remote device 106 is generally at a tilt angle (for example, the second remote device is located at a height above the device 102). Communication with the third remote device 108 is generally at the broad side of the antenna, such as generally in the vertical direction.

The device 102 may be a wireless communication device, such as a sensing device (for example, a parking meter used for traffic control). In other embodiments, the device 102 is a vehicle, such as an automobile, configured to communicate with the various remote devices 104, 106, 108. In other various embodiments, the device 102 may be a stationary component, such as a device used in a traffic control or traffic monitoring system. The device may have other applications in alternative embodiments. The device 102 includes a housing 110 holding the antenna assembly 100.

Figure 2:
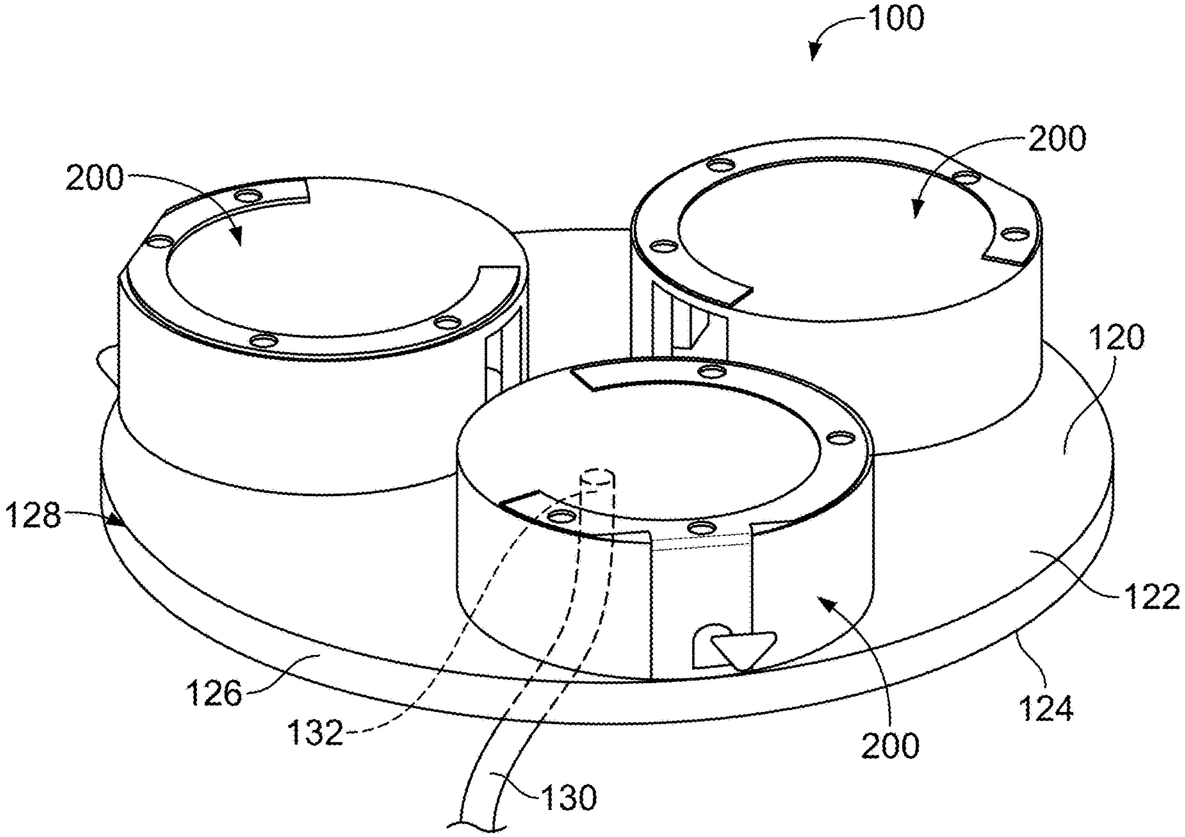
FIG. 2 is a perspective view of the antenna assembly in accordance with an exemplary embodiment.

FIG. 2 is a perspective view of the antenna assembly 100 in accordance with an exemplary embodiment. The antenna assembly 100 includes a ground plane 120 and a plurality of antenna elements 200 coupled to the ground plane 120. In an exemplary embodiment, the antenna elements 200 are circularly polarized antenna elements. The antenna elements 200 may be planar inverted F antennas (PIFA) in various embodiments. In the illustrated embodiment, three antenna elements 200 are provided; however, greater or fewer antenna elements 200 may be provided in alternative embodiments. The antenna elements 200 are spaced equidistant from each other, such as being positioned at 120° apart from each other. The antenna elements 200 may be identical to each other in an exemplary embodiment.

The ground plane 120 includes an upper surface 122 and a lower surface 124. The ground plane 120 has an edge 126 between the upper surface 122 and the lower surface 124. The edge 126 defines a periphery 128 of the ground plane 120. In the illustrated embodiment, the ground plane 120 is circular; however, the ground plane 120 may have other shapes in alternative embodiments. The ground plane 120 is electrically conductive. Optionally, the ground plane 120 may be a metal plate or disc. Alternatively, the ground plane 120 may be formed by a ground layer or conductive circuit of a printed circuit board. For example, the ground layer may be an upper layer at the upper surface 122 and/or a lower layer at the lower surface 124 and/or may be an intermediate layer of the printed circuit board. The printed circuit board may include other circuits, such as feed circuits electrically connected to the antenna elements 200. An antenna feed 130, such as a coaxial cable, may be electrically connected to the feed circuits at an antenna feed port 132. The antenna feed board may be provided at the center of the ground plane 120 in various embodiments. Optionally, a single antenna feed 130 is provided and is electrically connected to each of the antenna elements 200. Alternatively, separate antenna feeds 130 may be provided and electrically connected to the corresponding antenna elements 200.

Figure 3:
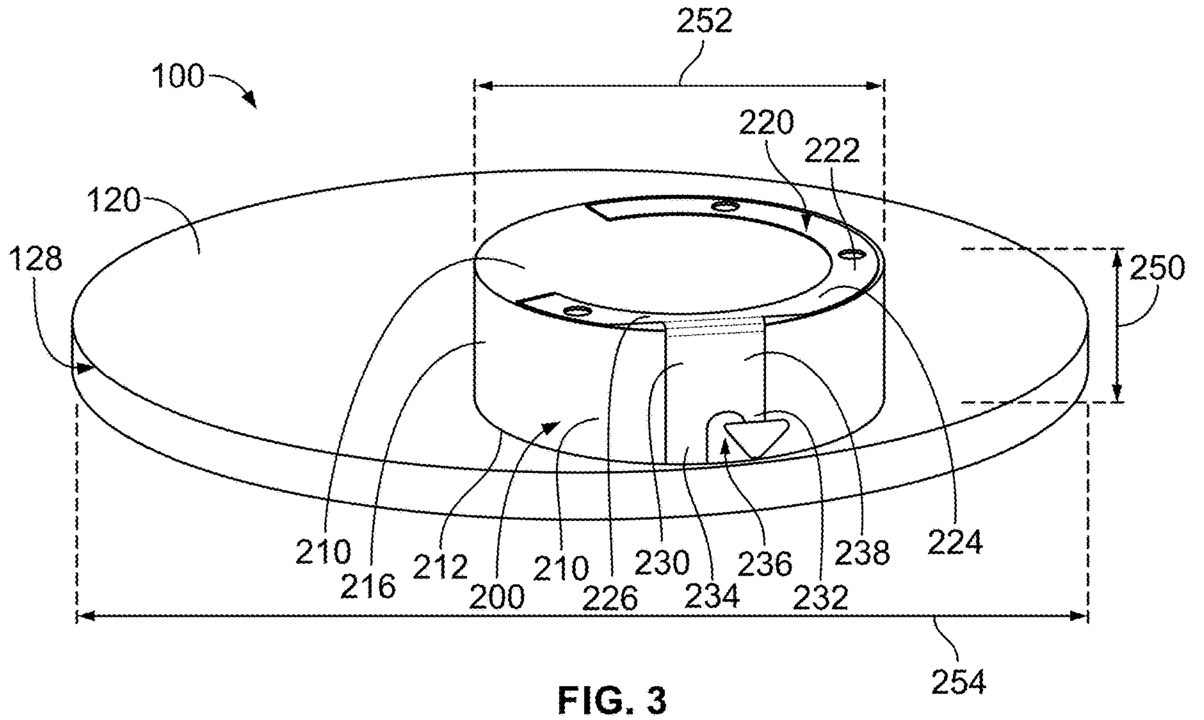
FIG. 3 is a perspective view of a portion of the antenna assembly in accordance with an exemplary embodiment.

FIG. 3 is a perspective view of a portion of the antenna assembly 100 in accordance with an exemplary embodiment. FIG. 3 illustrates one of the antenna elements 200 coupled to the ground plane 120. The antenna element 200 is coupled to the ground plane 120 near the periphery 128 of the ground plane 120. The antenna element 200 is offset from the center of the ground plane 120. Other mounting locations are possible in alternative embodiments.

The antenna element 200 includes a dielectric base 210 and a resonator element 220 coupled to the dielectric base 210. The dielectric base 210 provides mechanical support for the resonator element 220. In the illustrated embodiment, the dielectric base 210 is cylindrical having a top 212, a bottom 214, and a side 216 between the top 212 and the bottom 214. The bottom 214 is mounted to the ground plane 120. The dielectric base 210 may have other shapes in alternative embodiments.

The resonator element 220 includes a loop 222 and a conductive leg 230 extending from the loop 222. The loop 222 is provided at the top 212 in the illustrated embodiment. The conductive leg 230 extends along the side 216 between the top 212 and the bottom 214. In the illustrated embodiment, the loop 222 is a partial loop extending only partially circumferentially around the dielectric base 210. Optionally, the loop 222 may be provided at the outer periphery of the top 212. Other locations are possible in alternative embodiments. The loop 222 includes a right-hand segment 224 extending to the right side of the conductive leg 230 and a left-hand segment 226 extending to the left side of the conductive leg 230. In the illustrated embodiment, the right-hand segment 224 is longer than the left-hand segment 226. In alternative embodiments, the right-hand segment 224 and the left-hand segment 226 may have equal lengths. In other alternative embodiments, the left-hand segment 226 may be longer than the right-hand segment 224. Having the right-hand segment 224 are longer than the left-hand segment 226 makes the resonator element 220 generally right-hand circularly polarized (RHCP). The provision of the left-hand segment 226 provides some left-hand circularly polarized (LHCP) radiation.

The conductive leg 230 includes a feed tab 232 and a ground tab 234 with a slot 236 between the feed tab 232 and the ground tab 234. The slot 236 provides an air gap between the feed tab 232 and the ground tab 234. In the illustrated embodiment, the slot 236 does not extend along the entire height of the conductive leg 230; however, the slot 236 may have other heights in alternative embodiments. The conductive leg 230 includes an intermediate portion 238 between the loop 222 and the tabs 232, 234. Sizes and shapes of the feed tab 232, the ground tab 234, and the slot 236 affect the antenna characteristics of the antenna element 200.

In an exemplary embodiment, the antenna element 200 is designed for operation at a Wi-Fi/Bluetooth frequency, such as 2.4 GHz. The antenna element 200 may be designed for operation at other frequencies in alternative embodiments. The antenna element 200 may be designed for operation multiple frequencies in various embodiments. In an exemplary embodiment, the antenna element 200 is electrically small. For example, the dimensions of the antenna element 200 are less than 0.5 wavelength at the target frequency. The antenna element 200 has a height 250 and a width 252. The antenna element 200 is puck-shaped having the width 252 defined by a diameter of the antenna element 200, which is greater than the height 250. In an exemplary embodiment, the width 252 may be less than 0.2 wavelength. In various embodiments, the width 252 may be less than 0.15 wavelength. In an exemplary embodiment, the width 252 is 0.13 wavelength. In an exemplary embodiment, the antenna element 200 has a low-profile. The height 250 is less than 0.1 wavelength. In various embodiments, the height 250 may be less than 0.05 wavelength. In an exemplary embodiment, the ground plane 120 is sized to fit a plurality of the antenna elements 200 in relatively close proximity to each other. The ground plane 120 has a width 254 less than 0.5 wavelength. The ground plane 120 may have a width 254 less than 0.35 wavelength. In an exemplary embodiment. The width 254 is 0.32 wavelength. In an exemplary embodiment, the height 250 of the antenna element 200 is 6 mm, the width 252 of the antenna element 200 is 16 mm and the width 254 of the ground plane 120 is 40 mm. The antenna element 200 and the ground plane 120 may have other dimensions in alternative embodiments.

Figure 4:
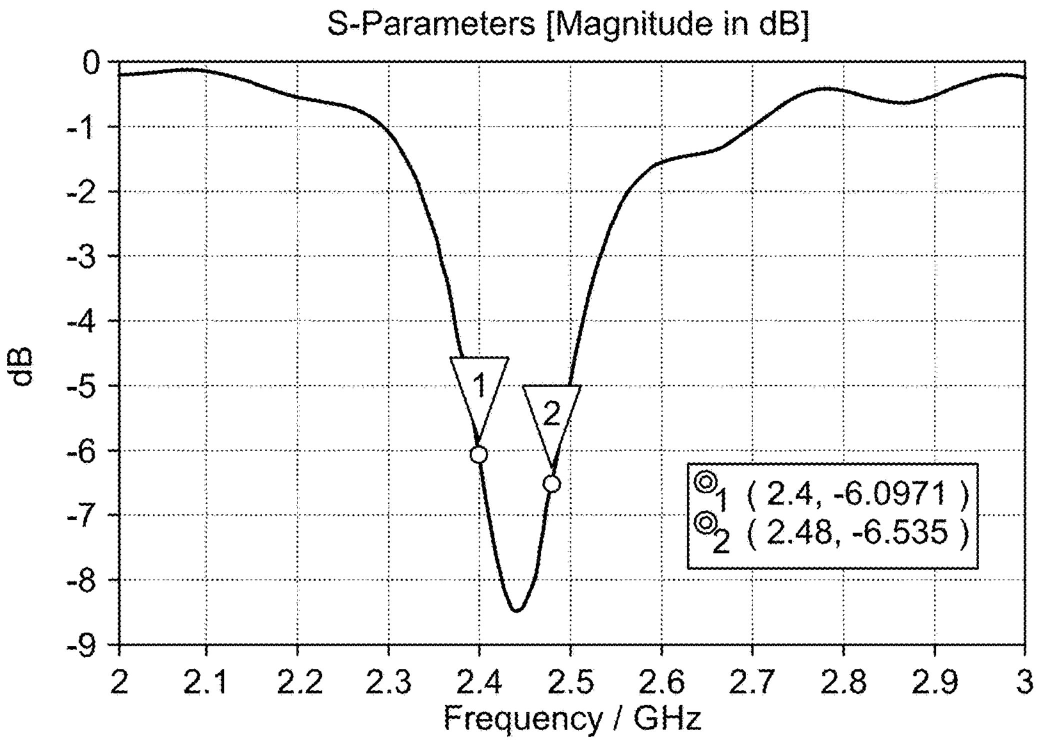
FIG. 4 is a chart illustrating an operating frequency of the antenna element in accordance with an exemplary embodiment.

FIG. 4 is a chart illustrating an operating frequency of the antenna element 200 in accordance with an exemplary embodiment. The antenna element 200 may be designed to operate at approximately 2.4 GHz, such as for Wi-Fi/Bluetooth communication.

FIG. 5 is a chart illustrating various modes of operation of the antenna assembly 100 in accordance with an exemplary embodiment. In the illustrated embodiment, the antenna assembly 100 is operable in a first operation mode 500, a second operation mode 502, and a third operation mode 504. The first operation mode 500 is an in-phase operation mode where each of the antenna elements 200 are combined in-phase with each other. The second operation mode 502 is a right-hand operation mode where the antenna elements 200 have a right-hand phase shift. The third operation mode 504 is a left-hand operation mode for the antenna elements 200 have a left-hand phase shift.

In an exemplary embodiment, the antenna assembly 100 includes three antenna elements 200 spaced equidistant blade around the periphery 128 of the ground plane 120 (For example, spaced 120° apart). The antenna elements 200 are rotated relative to each other such that the antenna elements 200 face in directions that are 120° offset from each other. As such, the main radiation direction of each antenna element 200 is in a direction that is 120° offset from the other antenna elements 200.

In the first operation mode 500, the antenna signals of each of the antenna elements 200 are combined in-phase with each other. The antenna signals are combined without any phase shift or delay in any of the antenna signals. For example, the single antenna feed port 132 is provided at the center of the ground plane 120. The transmission paths between the antenna feed port 132 and each of the feed points (for example, feed tab 232 shown in FIG. 2) for the resonator elements 220 of the antenna elements 200 may have identical path lengths to avoid skew or delay along the path between the antenna elements 200 and the antenna feed port 132. As such, the antenna signals of each of the antenna elements 200 are combined in-phase with each other. Due to the longer right-hand segments 224 of the resonator elements 220, the antenna elements 200 are right-hand circularly polarized (RHCP) dominated. Having the plurality of antenna elements 200, which are offset from each other around the ground plane 120, provides an omnidirectional radiation pattern for the antenna assembly 100. In an exemplary embodiment, the radiation pattern is omnidirectional in the horizontal plane. In an exemplary embodiment, the antenna assembly 100 has a maximum gain of −0.2 dBi (RHCP), a 3 dB beamwidth of 95° (RHCP), and an axial ratio within the 3 dB beamwidth of less than 8 dB. Changing of the size and/or shape and/or orientation of the antenna elements 200 and/or the ground plane 120 may affect the maximum gain, the 3 dB beamwidth, and the axial ratio.

In the second operation mode 502, the antenna signals of each of the antenna elements 200 are combined with a right-hand phase shift. The antenna signals are combined with delay elements to cause the phase shift. For example, the transmission paths between the antenna feed port 132 and the feed points for the resonator elements 220 of the antenna elements 200 may have different path lengths to intentionally induce skew or delay along the paths between the antenna elements 200 and the antenna feed port 132. For example, a first antenna element 200*a* may have a normal path length, a second antenna element 200*b* may have a longer path length corresponding to 120° phase shift from the first antenna element 200*a*, and a third antenna element 200*c* may have an even longer path length corresponding to 240° phase shift from the first antenna element 200*a*. As such, the antenna signals of each of the antenna elements 200 are combined with a right-hand phase shift. Due to the longer right-hand segments 224 of the resonator elements 220, the antenna elements 200 are right-hand circularly polarized (RHCP) dominated. The right-hand phase shift causes the radiation pattern to be broadside directional in a generally vertical direction. In an exemplary embodiment, the antenna assembly 100 has a maximum gain of 3.3 dBi (RHCP), a 3 dB beamwidth of 133° (RHCP), and an axial ratio within 3 dB beamwidth of less than 6 dB. Changing of the size and/or shape and/or orientation of the antenna elements 200 and/or the ground plane 120 may affect the maximum gain, the 3 dB beamwidth, and the axial ratio.

In the third operation mode 504, the antenna signals of each of the antenna elements 200 are combined with a left-hand phase shift. The antenna signals are combined with delay elements to cause the phase shift. For example, the transmission paths between the antenna feed port 132 and the feed points for the resonator elements 220 of the antenna elements 200 may have different path lengths to intentionally induce skew or delay along the paths between the antenna elements 200 and the antenna feed port 130. For example, the third antenna element 200*c* may have a normal path length, the second antenna element 200*b* may have a longer path length corresponding to 120° phase shift from the third antenna element 200*c*, and the first antenna element 200*a* may have an even longer path length corresponding to 240° phase shift from the third antenna element 200*c*. As such, the antenna signals of each of the antenna elements 200 are combined with a left-hand phase shift. The phase shift causes the dominant circular polarization to be left-hand circularly polarized (LHCP) dominated. The left-hand phase shift causes the radiation pattern to be broadside directional in a generally vertical direction. In an exemplary embodiment, the antenna assembly 100 has a maximum gain of 3.9 dBi (LHCP), a 3 dB beamwidth of 112° (LHCP), and an axial ratio within 3 dB beamwidth of less than 5 dB. Changing of the size and/or shape and/or orientation of the antenna elements 200 and/or the ground plane 120 may affect the maximum gain, the 3 dB beamwidth, and the axial ratio. The phase shift may be controlled by the transmission lines, such as by controlling the lengths of the transmission lines or by adding electrical components to the transmission line to cause delay and affect the phase shift. Optionally, variable phase shift circuits can be used to change the phases of the antenna elements individually, so the operation mode can change or shift between the operation modes 500, 502, and 504.

The antenna assembly 100 may be periodically switched between the various operation modes, such as at intervals, such as with variable phase shift circuits. The first operation mode 500 may be for communication (for example, transmit and/or receive) with corresponding remote devices, such as the first and second remote devices 104, 106 for vehicle communication, keyless entry, access control, remote control, tracking, tolling, other IoT applications, and the like. The second and third operation modes 502, 504 may be for communication with the third remote devices 108, such as satellite communication global navigation, RFID, and the like, due to the generally broadside directional radiation patterns. In various embodiments, the second operation mode 502 is for receiving communication signals and the third operation mode 504 is for transmitting communication signals, or vice versa. As such, the antenna assembly 100 is capable of beam steering and polarization switching for enhanced wireless communication from a single antenna assembly 100. The antenna assembly 100 is electrically small and has a low profile and can be panel mounted to a generally flat surface without occupying considerable space above the panel. The antenna assembly 100 is a broad beam, circularly polarized antenna assembly. The antenna assembly 100 is reconfigurable, being operable as an omnidirectional antenna assembly and as an axial directional antenna assembly by switching between the various operation modes. The radiation beam direction and polarization of the antenna assembly 100 can be changed for different applications. The antenna assembly 100 is low cost compared to conventional antennas providing such advantages.

Figure 6:
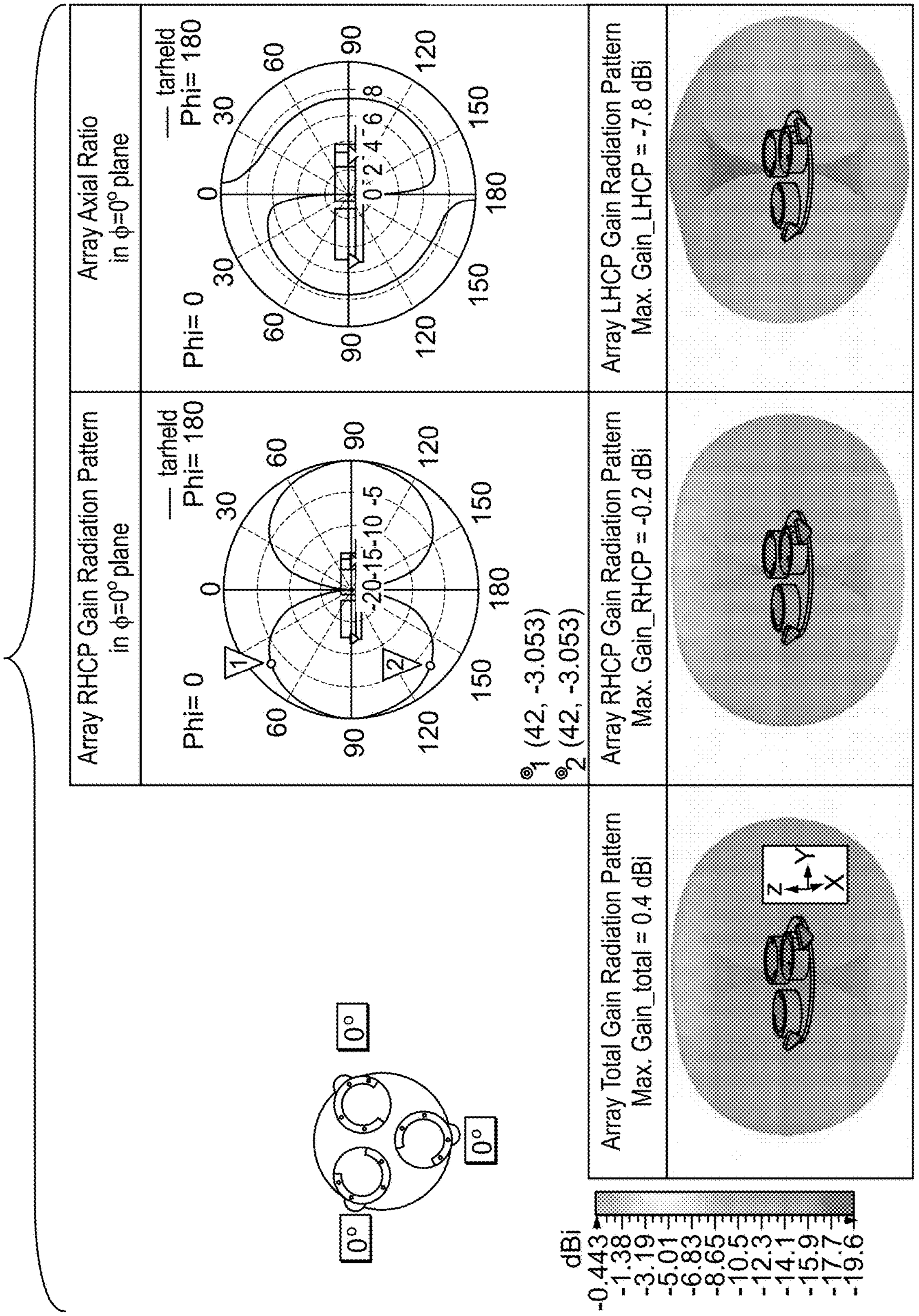
FIG. 6 is a chart showing antenna characteristics of the antenna assembly operated in a first operation mode.

FIG. 6 is a chart showing antenna characteristics of the antenna assembly 100 operated in the first operation mode showing in-phase combination of the antenna elements 200. FIG. 6 shows the gain radiation pattern and the axial ratio of the antenna assembly 100. FIG. 6 shows the generally omni-directional radiation patterns in the generally horizontal direction, including the total gain radiation pattern, the RHCP gain radiation pattern, and the LHCP gain radiation pattern.

Figure 7:
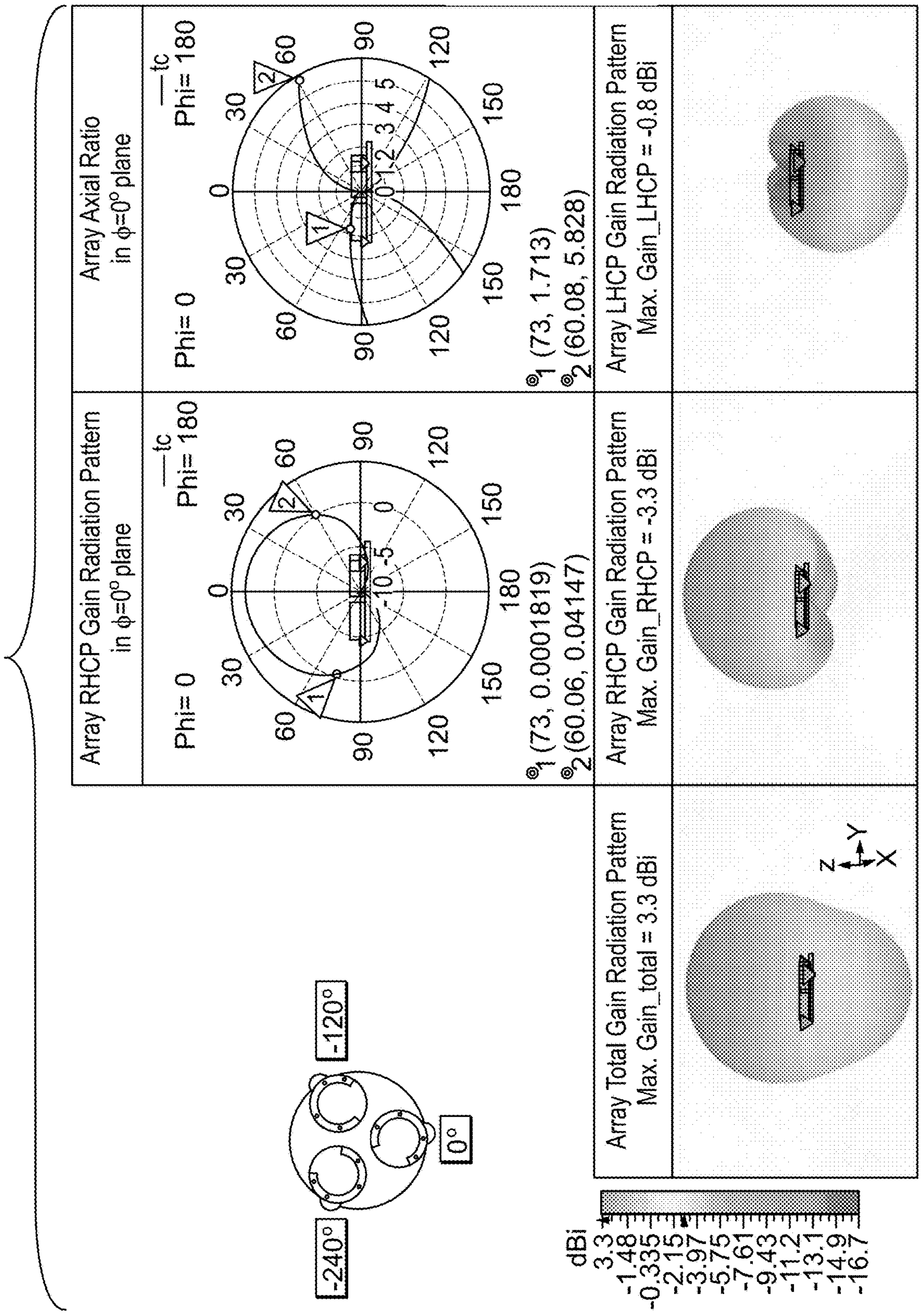
FIG. 7 is a chart showing antenna characteristics of the antenna assembly operated in a second operation mode.

FIG. 7 is a chart showing antenna characteristics of the antenna assembly 100 operated in the second operation mode showing right-hand phase shifts of the antenna elements 200. FIG. 7 shows the gain radiation pattern and the axial ratio of the antenna assembly 100. FIG. 7 shows the generally broadside directional radiation patterns in the generally vertical direction, including the total gain radiation pattern, the RHCP gain radiation pattern, and the LHCP gain radiation pattern.

Figure 8:
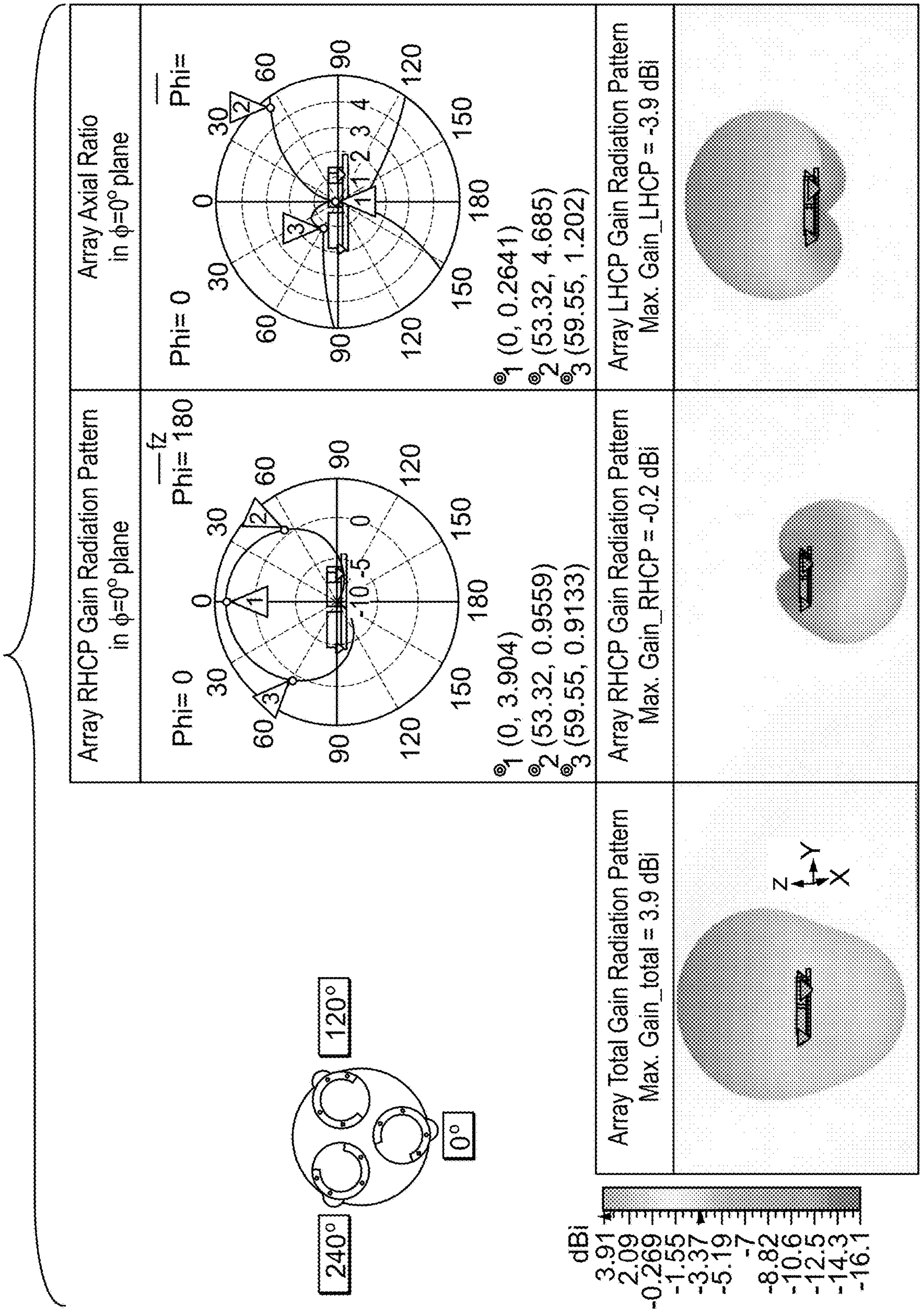
FIG. 8 is a chart showing antenna characteristics of the antenna assembly operated in a third operation mode.

FIG. 8 is a chart showing antenna characteristics of the antenna assembly 100 operated in the third operation mode showing left-hand phase shifts of the antenna elements 200. FIG. 8 shows the gain radiation pattern and the axial ratio of the antenna assembly 100. FIG. 8 shows the generally broadside directional radiation patterns in the generally vertical direction, including the total gain radiation pattern, the RHCP gain radiation pattern, and the LHCP gain radiation pattern.

Figure 9:
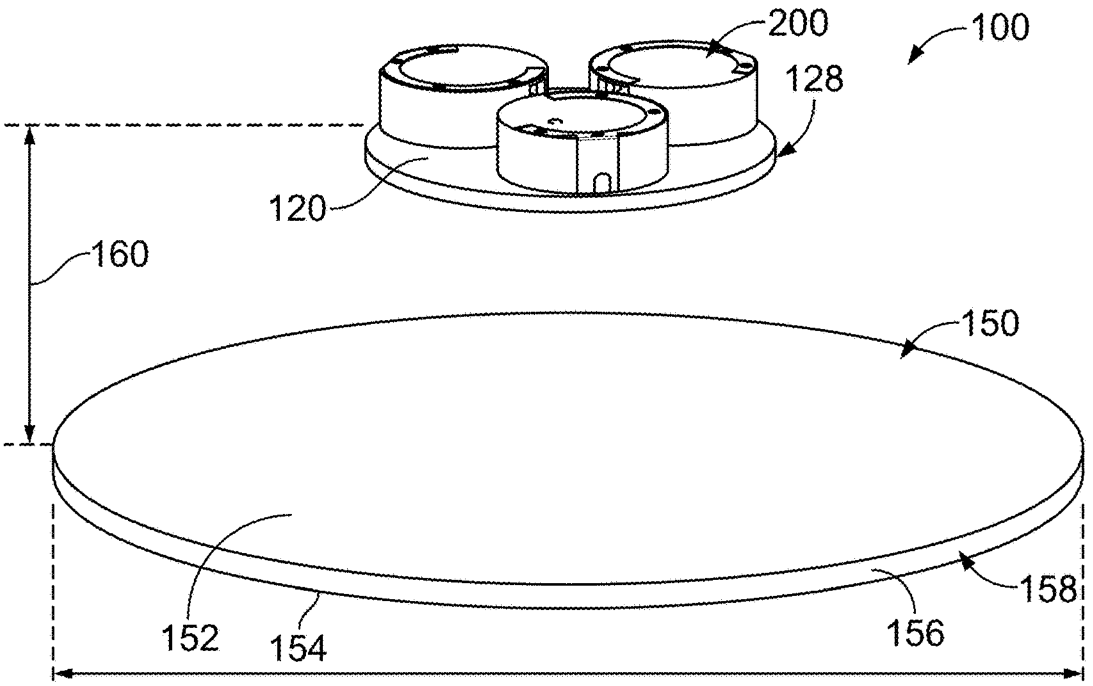
FIG. 9 illustrates the antenna assembly in accordance with an exemplary embodiment with a reflector.

FIG. 9 illustrates the antenna assembly 100 in accordance with an exemplary embodiment. The antenna assembly 100 includes a reflector 150 below the ground plane 120 and the antenna elements 200. The reflector 150 is used to tilt the maximum radiation of the antenna elements 200 upward by a tilt angle to change the radiation pattern from the horizontal plane to a higher azimuth angle when the antenna assembly 100 is operated in the first operation mode. For example, the reflector 150 changes the radiation pattern from an omnidirectional radiation pattern to a conical radiation pattern.

The reflector 150 is manufactured from a metal material. The reflector 150 is electrically conductive. The reflector 150 has an upper surface 152 facing the ground plane 120 and the antenna elements 200 and a lower surface 154 opposite the upper surface 152. The reflector 150 has an edge 156 between the upper surface 152 and the lower surface 154 defining a periphery 158 of the reflector 150. In the illustrated embodiment, the reflector 150 is circular; however, the reflector 150 may have other shapes in alternative embodiments. In an exemplary embodiment, the reflector 150 is a larger surface area than the ground plane 120. For example, the periphery 158 of the reflector 150 is located beyond the periphery 128 of the ground plane 120.

In an exemplary embodiment, the reflector 150 is planar and oriented parallel to the ground plane 120. However, in alternative embodiments, the reflector 150 may be angled relative to the ground plane 120. In other alternative embodiments, the reflector 150 may be nonplanar, such as being dish shaped or concave. The shape of the reflector 150 is used to focus the antenna radiation. The reflector 150 is spaced apart from the ground plane 120 by a spacing 160. The spacing 160 controls the tilt angle of the maximum radiation direction of the antenna elements 200. Additionally, the size and/or shape of the reflector 150 controls the tilt angle. The reflector 150 has a width 162 greater than the width of the ground plane 120. Optionally, the ground plane 120 may be centered over the reflector 150. Alternatively, the ground plane 120 may be offset from the center of the reflector 150, which may affect the directionality of the antenna radiation pattern.

Figure 10:
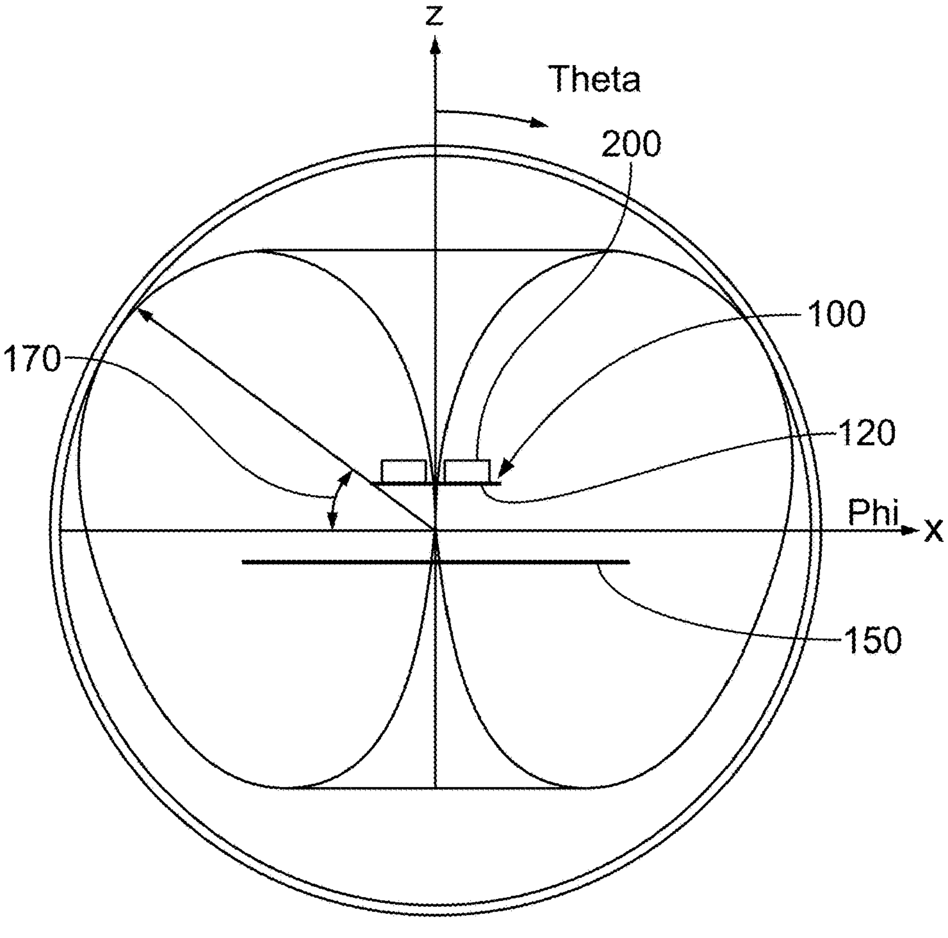
FIG. 10 is a schematic illustration showing the radiation pattern of the antenna assembly using the reflector positioned below the ground plane and the antenna elements in accordance with an exemplary embodiment.

FIG. 10 is a schematic illustration showing the radiation pattern of the antenna assembly 100 using the reflector 150 positioned below the ground plane 120 and the antenna elements 200. The reflector 150 is used to tilt the maximum radiation of the antenna elements 200 upward by a tilt angle 170 to change the radiation pattern from the horizontal plane to a higher azimuth angle. In the illustrated embodiment, the reflector 150 causes the radiation pattern to be a conical radiation pattern where the maximum radiation is located a distance above the horizontal plane.

Figure 11:
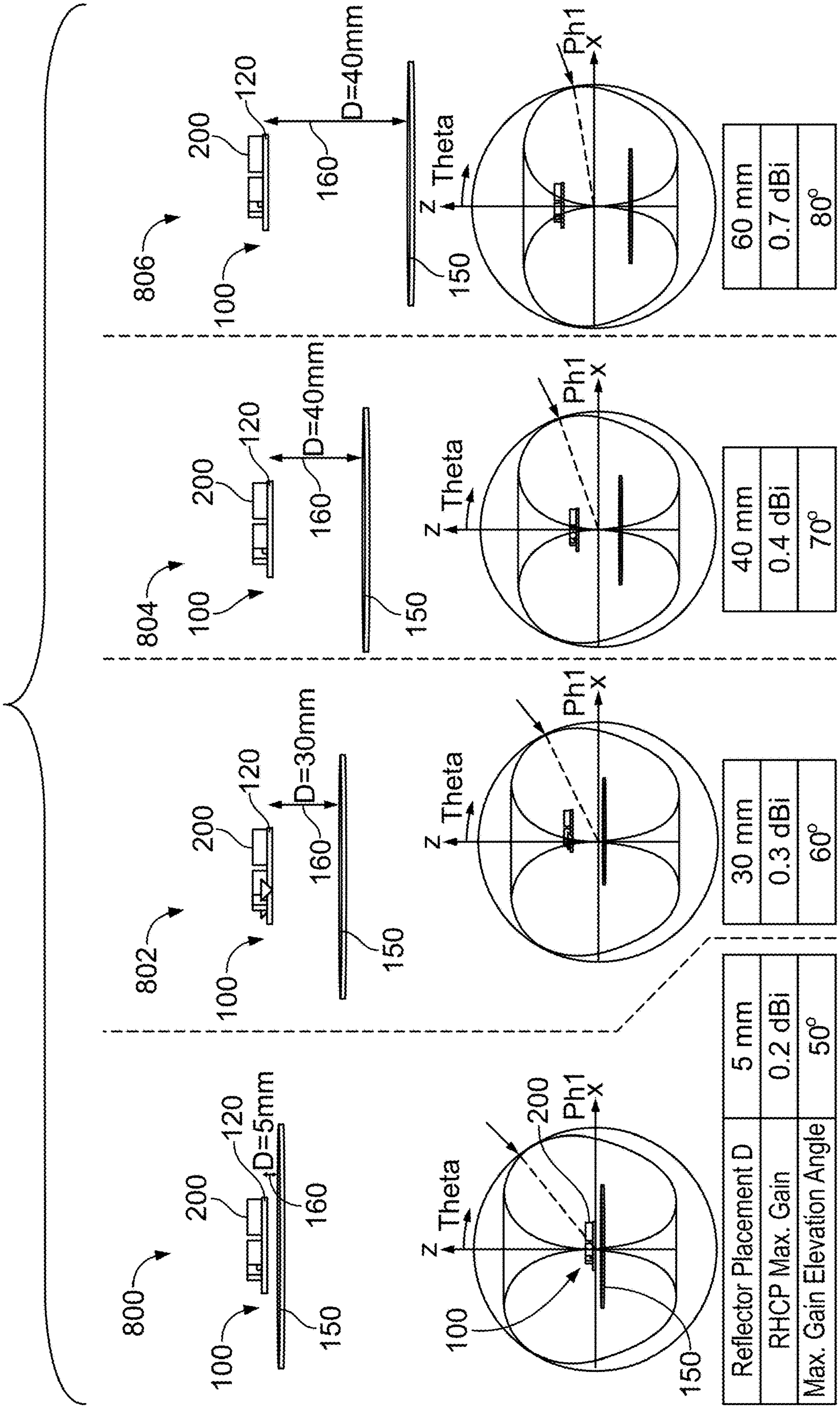
FIG. 11 is a chart showing various examples of the antenna assembly with the reflector at different spacings from the ground plane and the antenna elements in accordance with an exemplary embodiment.

FIG. 11 is a chart showing various examples of the antenna assembly 100 with the reflector 150 at different spacings 160 from the ground plane 120 and the antenna elements 200.

In a first example 800, the reflector 150 is positioned a distance of 5 mm from the antenna elements 200. The antenna assembly 100 has a maximum gain of 0.2 dBi. The maximum gain elevation angle is 50°.

In a second example 802, the reflector 150 is positioned a distance of 30 mm from the antenna elements 200. The antenna assembly 100 has a maximum gain of 0.3 dBi. The maximum gain elevation angle is 60°.

In a third example 804, the reflector 150 is positioned a distance of 40 mm from the antenna elements 200. The antenna assembly 100 has a maximum gain of 0.4 dBi. The maximum gain elevation angle is 70°.

In a fourth example 806, the reflector 150 is positioned a distance of 60 mm from the antenna elements 200. The antenna assembly 100 has a maximum gain of 0.7 dBi. The maximum gain elevation angle is 80°.

The antenna characteristics, such as the radiation pattern, are affected by the spacing 160 between the reflector 150 and the antenna elements 200. If a higher elevation angle is desirable, the reflector 150 may be positioned closer to the antenna elements 200. If a lower elevation angle is desirable, the reflector 150 may be positioned further from the antenna elements 200. Other changes are possible to change the radiation pattern, such as changes in the size and/or shape of the reflector 150.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. An antenna assembly comprising:

a ground plane having a periphery;

a plurality of antenna elements, each antenna element resonant at a frequency f, the antenna elements positioned generally equidistant from each other around the periphery, the plurality of antenna elements being electrically connected to a single antenna feed port, the antenna elements providing a right-hand circularly polarized (RHCP) generally omnidirectional radiation pattern in a first operation mode, the antenna elements providing a right-hand circularly polarized (RHCP) broadside radiation pattern in a second operation mode, and the antenna elements providing a left-hand circularly polarized (LHCP) broadside radiation pattern in a third operation mode; and a reflector separate and discrete from the ground plane and from the antenna elements, the reflector positioned below and spaced apart from the ground plane and the antenna elements, the reflector tilting a maximum radiation of the antenna elements upward by a tilt angle in the first operation mode to create a conical radiation pattern.

2. The antenna assembly of claim 1, wherein the antenna elements are connected to the antenna feed port without phase shift in the first operation mode, the antenna elements are connected to the antenna feed port with right-hand phase shifts in the second operation mode, and the antenna elements are connected to the antenna feed port with left-hand phase shifts in the third operation mode.

3. The antenna assembly of claim 2, wherein the antenna elements are connected to the antenna feed port out of phase in the second and third operation mode.

4. The antenna assembly of claim 2, wherein transmission feed lengths between the antenna elements and the antenna feed port are variable to control phase shifts.

5. The antenna assembly of claim 1, wherein the plurality of antenna elements include a first antenna element, a second antenna element, and a third antenna element, the second antenna element having a −120° phase shift compared to the first antenna element in the second operation mode and having a +120° phase shift compared to the first antenna element in the third operation mode, the third antenna element having a −240° phase shift compared to the first antenna element in the second operation mode and having a +240° phase shift compared to the first antenna element in the third operation mode.

6. The antenna assembly of claim 5, wherein the second antenna element has a 0° phase shift compared to the first antenna element in the first operation mode and the third antenna element has a 0° phase shift compared to the first antenna element in the first operation mode.

7. The antenna assembly of claim 1, wherein the reflector is spaced apart from the ground plane by a spacing, the spacing being variable and selected to control the tilt angle.

8. The antenna assembly of claim 1, wherein the reflector has a surface area, the surface area being larger than a surface area of the ground plane, the surface area being selected to control the tilt angle.

9. The antenna assembly of claim 1, wherein the reflector is planar and oriented parallel to the ground plane, the reflector having a periphery oversized relative to the periphery of the ground plane such that the periphery of the reflector being outside of the periphery of the ground plane.

10. The antenna assembly of claim 1, wherein each antenna element includes a dielectric base having a top, a bottom, and a side between the top and the bottom, the antenna element including a resonator element coupled to the dielectric base, the resonator element including a loop and a conductive leg extending from the loop, the conductive leg including a feed tab and a ground tab separated by a slot, the ground tab electrically connected to the ground plane, the feed tab electrically connected to the antenna feed port, the loop provided at the top of the dielectric body, the conductive leg extending along the side of the dielectric body.

11. The antenna assembly of claim 1, wherein each antenna element includes a planar inverted F antenna (PIFA).

12. The antenna assembly of claim 1, wherein the plurality of antenna elements are identical to each other.

13. The antenna assembly of claim 1, wherein each antenna element has a low profile having a height less than 0.1 wavelength, the antenna element having a width greater than the height, the width being less than 0.2 wavelength.

14. An antenna assembly comprising:

a ground plane having a periphery;

a plurality of antenna elements, each antenna element resonant at a frequency f, the antenna elements positioned generally equidistant from each other around the periphery, the plurality of antenna elements being electrically connected to a single antenna feed port to provide a generally omnidirectional radiation pattern; and a reflector positioned below the ground plane and the antenna elements, the reflector tilting a maximum radiation of the antenna elements upward by a tilt angle to create a conical radiation pattern, wherein the reflector is variably positionable relative to the antenna elements to control the tilt angle.

15. The antenna assembly of claim 14, wherein the reflector is spaced apart from the ground plane by a spacing, the spacing being selected to control the tilt angle, the reflector having a surface area, the surface area being selected to control the tilt angle.

16. The antenna assembly of claim 14, wherein the antenna elements provide a right-hand circularly polarized (RHCP) generally omnidirectional radiation pattern in a first operation mode, the antenna elements provide a right-hand circularly polarized (RHCP) broadside radiation pattern in a second operation mode, and the antenna elements provide a left-hand circularly polarized (LHCP) broadside radiation pattern in a third operation mode.

17. An antenna assembly comprising:

a ground plane having a periphery; and a plurality of antenna elements, each antenna element resonant at a frequency f, the antenna elements positioned generally equidistant from each other around the periphery, the antenna elements being contained within the periphery of the ground plane, the plurality of antenna elements being electrically connected to a single antenna feed port;

wherein the antenna elements provide a right-hand circularly polarized (RHCP) generally omnidirectional radiation pattern in a first operation mode, the antenna elements provide a right-hand circularly polarized (RHCP) broadside radiation pattern in a second operation mode, and the antenna elements provide a left-hand circularly polarized (LHCP) broadside radiation pattern in a third operation mode.

18. The antenna assembly of claim 17, wherein the antenna elements are connected to the antenna feed port without phase shift in the first operation mode, the antenna elements are connected to the antenna feed port with right-hand phase shifts in the second operation mode, and the antenna elements are connected to the antenna feed port with left-hand phase shifts in the third operation mode, the antenna elements being connected to the antenna feed port out of phase in the second and third operation mode.

19. The antenna assembly of claim 17, wherein the plurality of antenna elements include a first antenna element, a second antenna element, and a third antenna element, the second antenna element having a −120° phase shift compared to the first antenna element in the second operation mode and having a +120° phase shift compared to the first antenna element in the third operation mode, the third antenna element having a −240° phase shift compared to the first antenna element in the second operation mode and having a +240° phase shift compared to the first antenna element in the third operation mode.

20. The antenna assembly of claim 17, further comprising a reflector positioned below the antenna elements, the reflector tilting a maximum radiation of the antenna elements upward by a tilt angle to create a conical radiation pattern in the first operation mode.

21. The antenna assembly of claim 17, wherein the antenna elements are puck-shaped each having a height less than 0.1 wavelength and a diameter greater than the height.

* * * * *